(12) United States Patent
Wood, Jr. et al.

(10) Patent No.: US 6,599,383 B1
(45) Date of Patent: Jul. 29, 2003

(54) COEXTRUDED FILM

(75) Inventors: Ronald C. Wood, Jr., Pittsford, NY (US); Claudio de Moraes Paulino, Rochester, NY (US)

(73) Assignee: Terphane Inc., Bloomfield, NY (US)

( * ) Notice: Subject to any disclaimer, the term of this patent is extended or adjusted under 35 U.S.C. 154(b) by 0 days.

(21) Appl. No.: 09/584,750

(22) Filed: Jun. 1, 2000

Related U.S. Application Data

(60) Provisional application No. 60/137,401, filed on Jun. 2, 1999.

(51) Int. Cl.$^7$ .................. B44C 1/165; B29C 47/04; B41M 3/12; B41C 1/06; B32B 27/00
(52) U.S. Cl. .............. 156/230; 156/238; 156/240; 156/244.11; 156/247; 156/277; 156/289; 427/148; 427/412.5; 427/416; 428/195; 428/207; 428/483; 428/914; 101/34; 264/173.12; 264/173.16; 430/200
(58) Field of Search .................. 156/230, 231, 156/234, 238, 239, 240, 242, 243, 244.11, 247, 277, 289; 427/146, 147, 148, 131, 209, 412.1, 412.5, 416; 428/195, 207, 480, 483, 914; 8/468, 471; 430/200; 101/33, 34; 264/171.1, 173.12, 173.16, 173.18, 469

(56) References Cited

U.S. PATENT DOCUMENTS

| 4,419,411 A | * | 12/1983 | Park ........................... 428/516 |
| 5,069,962 A | * | 12/1991 | Okazaki et al. ............. 428/323 |
| 5,236,768 A | * | 8/1993 | Fujii et al. .................. 428/195 |

FOREIGN PATENT DOCUMENTS

| EP | 0 827 828 | 3/1998 |
| GB | 1 434 521 | 5/1976 |
| WO | WO 94/03333 | 2/1994 |

\* cited by examiner

*Primary Examiner*—J. A. Lorengo
(74) *Attorney, Agent, or Firm*—Pillsbury Winthrop LLP

(57) ABSTRACT

The present application discloses a film comprising a first layer formed from a first extruded and solidified material and a second layer formed from a second extruded and solidified material. The first material has a lower coefficient of friction when solidified than the second material.

13 Claims, 1 Drawing Sheet

COEXTRUDED FILM

The present application claims priority to U.S. Provisional Appln. of Wood et al., Ser. No. 60/137,401, filed Jun. 2, 1999, the entirety of which is hereby incorporated into the present application by reference.

FIELD OF THE INVENTION

The present invention relates to extruded films and, more particularly, to an extruded film for use in an operation wherein the film is subject to heat transfer.

BACKGROUND OF THE INVENTION

Thermal transfer printing and a related process, dye diffusion transfer, utilize a thin film, usually made of polyester, that is coated on one side with a coloring medium and on the other side with a low friction material, such as silicone or a similar low friction material. During thermal transfer printing, the coated film is positioned in a print engine that includes a thermal printing head. The printing head typically has a row of thermistors that are selectively activated and deactivated to heat the film so as to cause the coloring medium to be transferred from the film to a selected substrate. Specifically, the side of the film coated with the low friction material is engaged with the printing head and the side coated with the coloring medium is engaged with the selected substrate. Activating the printing head heats the film and causes the coloring medium to be transferred to the substrate. After the coloring medium has been transferred from the film to the selected substrate, the film is moved relative to the printing head so that a fresh portion of the film is positioned adjacent the printing head and ready for the coloring medium to be transferred therefrom. During this relative movement, the film slides over the printing head.

In typical thermal transfer printing operations, the printing head is heated to temperatures around 300–600° F. At this temperature, for the ribbon to slide over the printing head in a satisfactory manner without sticking or becoming distorted, the low friction coating on the film must have suitable slipping characteristics not only at room temperature, but also at the operating temperatures of these printing heads.

As mentioned above, it has been known in the art to apply a cross-linked silicone or other similar coating to the surface of the film that comes in contact with the printing head. This coating and the coloring medium are often applied to the opposing sides of the film during the same process. The addition of another coating process for applying the silicone coating adds significant production costs to the manufacturing of the film that it would be desirable to eliminate. Specifically, these additional costs are realized both in the form of the overhead costs which are invested in the equipment that applies the silicone coating and in the variable costs associated with the energy required to operate the apparatus and the persons or automated control systems needed to supervise its operation. It can thus be appreciated there is a need in the art for a method of making a film suitable for use in conjunction with a thermal printing head that obviates the need for a separate operation wherein a low friction coating is applied to the film.

SUMMARY OF THE INVENTION

To meet the above described need, one aspect of the present invention provides a film for use in conjunction with a thermal printing head during a thermal transfer printing process wherein a coloring medium is transferred to a selected substrate. The film comprises a first layer extruded and solidified from a first extrudible material and a second layer extruded and solidified from a second extrudible material. The first layer provides the film with a printer head engaging surface that slidably engages the thermal printing head during the printing process and the second layer provides the film with a color receiving surface opposite the printer head engaging surface. The color receiving surface is capable of having the coloring medium applied thereto and engages the selected substrate during the thermal transfer printing process. The first and second layers are arranged such that, when the coloring medium is applied to the color receiving surface, the printer head engaging surface can be slidably engaged with the thermal printing head and the color receiving surface can be engaged with a selected substrate to thereby allow the thermal printing head to apply heat to the film so as to cause the coloring medium to transfer from the coloring receiving surface to the selected substrate. The first extrudible material has a lower coefficient of friction when solidified than the second extrudible material so that the printer head engaging surface has a lower coefficient of friction than the color receiving surface to thereby allow the film to slide over the thermal printing head with less frictional resistance than if the first layer were extruded and solidified from the second extrudible material.

The film of the present invention may further comprise a third layer extruded and solidified from a third extrudible material and positioned between the first and second layers. Preferably, the film is constructed from three layers. Additionally, the first extrudible material may include a slipping agent that provides the first extrudible material with the lower coefficient of friction when solidified than the second extrudible material, as mentioned above. The slipping agent is preferably a silicone oil and is more preferably a 450,000 MW poly(methylsiloxane) oil supplied by Dow Chemical as a homopolymer PET masterbatch (Dow Corning MB 50-010).

It can be appreciated that extruding the first layer from an extrudible layer that has a lower coefficient when solidified than the second layer provides the film with its desired slipping characteristics on the printer head engaging surface. Providing the second layer with a higher coefficient of friction allows the coloring medium to adhere thereto in a satisfactory manner.

Because the film developed in accordance with this aspect of the invention is intended to be used in a thermal transfer printing operation, which includes standard thermal transfer printing and dye diffusion printing, it is preferred that the film have a suitable resistance to deformation under an application of heat. Coextruding films has been done to date with materials such as polypropylene, which does not withstand deformation when heated sufficiently to be used in thermal transfer printing. For films to be used in thermal transfer printing, it is preferred to use materials for both the first and second layers that function well under the application of heat. Satisfactory parameters for the materials of the first and second layers would be the ability to shrink less than 5% when heated to 300° F. for approximately 30 minutes. Examples of such materials include polyester, PEN, nylon, and polyimide. Polyester is preferred for its low cost.

Related aspects of the invention concern the method of making the type of film discussed above and the method of using this type of film in a thermal printing process.

Another aspect of the invention relates to a film that may be used in any type of process wherein heat is to be applied to the film. This aspect of the invention provides a film for use in an operation wherein heat is to be applied to the film. The film comprises a first layer extruded and solidified from a first extrudible material. The first layer provides the film with a first surface. A second layer is extruded and solidified from a second extrudible material. The second layer provides the film with a second surface opposite the first surface. The first and second materials are each materials that shrink less than 5% in surface area when heated to 300° F. for approximately 30 minutes. The first extrudible material has a lower coefficient of friction when solidified than the second extrudible material so that the first surface has a lower coefficient of friction than the second surface to thereby allow the film to slide over surfaces with less frictional resistance than if the first layer were extruded and solidified from the second extrudible material.

The film developed in accordance with this aspect of the invention may be used in processes such as forming bags for food products (e.g., potato chip bags) wherein the material is drawn over a die and it is desirable to provide the material with a low coefficient of friction on one side and yet retain suitable heat resistant characteristics.

Other objects, features, and advantages of the present invention will become apparent from the following detailed description, the accompanying drawings, and the appended claims.

DETAILED DESCRIPTION OF THE INVENTION

Figure 1:
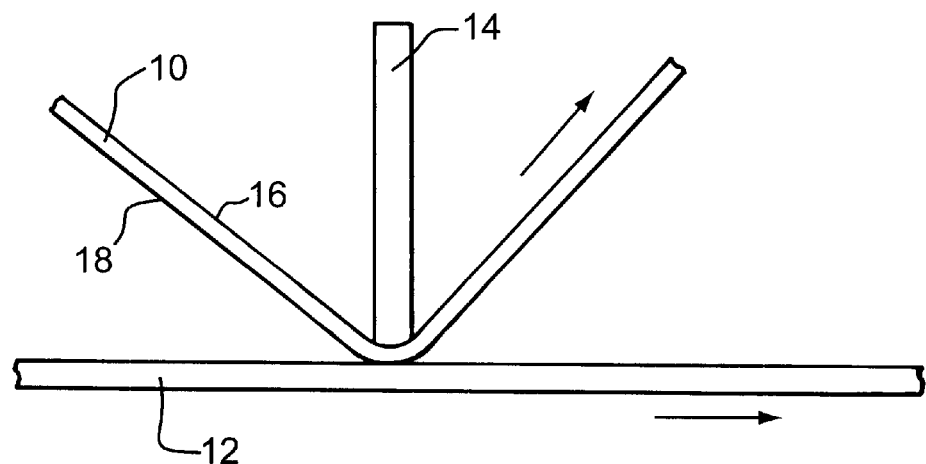
FIG. 1 is a schematic profile view showing the film of the present invention being utilized in a thermal transfer printing process.

FIG. 1 shows a schematic view of the film 10 of the present invention being utilized in a thermal transfer printing process. In the printing process, a selected substrate 12 is positioned adjacent a thermal printing head 14 and the film 10 is positioned between the printing head 14 and substrate 12. Specifically, the film 10 has a printing head engaging surface 16 slidably engaged with the printing head 14 and a color receiving surface 18 coated with a coloring medium and engaged with the substrate 12.

The printing head is heated to an average elevated temperature around 300–600° F. by thermistors that are activated to selectively heat the film 10. Heating the film to this elevated temperature causes the coloring medium to be transferred from the color receiving surface 18 to the selected substrate 12, thereby printing a pattern on the substrate 12. The film 10 is moved in an indexing manner after each transfer of coloring medium so that a fresh portion of the film 10 is positioned adjacent the printing head 14. Also, the substrate 12 is moved relative to the printing head so that the same portion of the substrate 12 is not printed upon a repeated number of times. As the film 10 moves relative to the printing head 14, the printer head engaging surface 16 slides over the printing head 14. In accordance with the principles of the present invention, the printer head engaging surface 16 is provided with a lower coefficient of friction than the color receiving surface so as to enhance its sliding movement over the printing head 14. The manner in which this is achieved is described hereinbelow.

Figure 2:
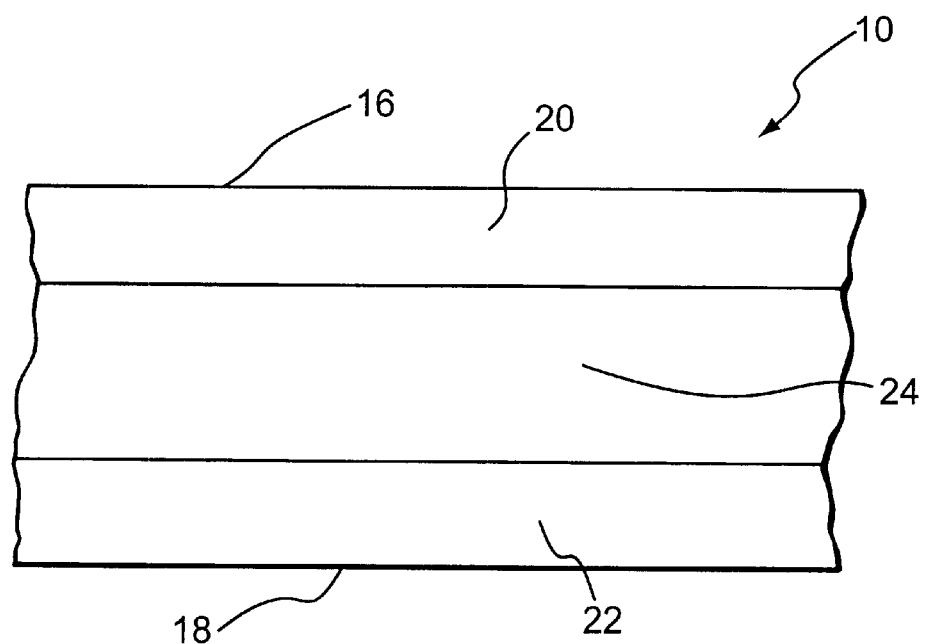
FIG. 2 is a schematic cross-sectional view showing the film of the present invention with the sizes of the layers exaggerated to illustrate the principles of the present invention.

The film 10 of the present invention comprises two or more layers formed from solidified, extrudible materials. A preferred embodiment of the film 10 shown herein includes three such layers, but it should be understood that the film may be constructed from only two layers or four or more layers. As shown in FIG. 2, the film 10 includes a first layer 20, a second layer 22, and a third layer 24 disposed between the first and second layers 20, 22. The first layer 20 provides the film 10 with the printer head engaging surface 16. The second layer 22 provides the film 10 with the color receiving surface 18.

The first layer 20 is formed from a first solidified, extrudible material. The preferred material for the first layer is a homopolymer polyester resin with between 500 ppm and 10,000 ppm silica and a slip agent mixed therein. The slip agent may be a silicone oil [poly(methylsiloxane), molecular weight 30,000 to 1,000,000], wax, a fatty amide, or another similar agent and is preferably provided at a level between 500 ppm and 75,000 ppm. Preferably, the first material has 4,500 ppm silica and 10,000 ppm silicone oil.

The use of a slip agent provides the first material with a low coefficient of friction when solidified so that the printer head engaging surface 16 can slide easily over the printer head 14 without sticking or distortion. The use of silica, which is in particulate form, creates bumps on the printer head engaging surface 16. These bumps reduce frictional contact between the printer head engaging surface 16 and the printer head 14 to reduce the coefficient of friction.

Because the first material itself provides the first layer 20 with its desired low coefficient of friction, there is no need to coat the printer head engaging surface 16 with a separate low friction material. The first material includes the slip agent that provides the printer head engaging surface 16 with a low coefficient of friction.

The second layer 22 is formed from a second solidified, extrudible material. The preferred material for the second layer is a homopolymer polyester resin with between 500 ppm and 5000 ppm silica. Preferably, the second, extrudible material has 2000 ppm silica. The homopolymer polyester resin provides the color receiving surface 18 with characteristics suitable for receiving the coloring medium thereon.

The third layer 24 is formed from a third solidified, extruded material. The third material is preferably a substantially pure homopolymer polyester resin or a homopolymer polyester resin with some silica mixed therein. To promote conservation and recyclablity the third extrudible material may include a portion of reground PET resin which has been derived from previously discarded extruded films. In a preferred embodiment, the third material is 45% reground PET resins.

The silica used in the first, second and third layers is a 2 $\mu$ average particle size silicone dioxide supplied by W. R. Grace, Davidson Chemical Division (Syloblock 46). The silicone oil is preferably a 450,000 MW poly(methylsiloxane) oil supplied by Dow Chemical as a homopolymer PET masterbatch (Dow Coming MB 50-010).

In the preferred arrangement, the third layer has a thickness of approximately 3.71 $\mu$m, the second layer has a thickness of 0.34 $\mu$m, and the first layer has a thickness of 0.45 $\mu$m. The combined thickness of the film 10 is thus 4.5 $\mu$m, the predominate thickness in use in the industry today. The next most popular thickness for the entire film is 5.7 $\mu$m. For a 5.7 $\mu$m thickness, the thickness of the third layer would be increased to 4.91 $\mu$m.

In one alternative embodiment of the invention, the first layer 20 is devoid of silica and, the third layer 24 is provided with 500 ppm to 10,000 ppm silica. In this alternative embodiment, the silica in the third layer 24 is sufficient to provide the above-mentioned bumps on the printer head engaging surface 16. The advantage of this alternative embodiment is that the silica and the silicone are in separate layers. Because of the porosity of silica particles, the silica may tend to absorb some of the silicone if they are used together in the first layer, thus leaving less silicone available for decreasing the coefficient of friction for the printer head engaging surface 16. By providing the silica and silicone in separate layers, this absorption problem is obviated.

In a second alternative embodiment of the invention, a silicone particulate, such as Tospearl available from General Electric, may be substituted in the first layer 20 in place of the silica. Silicone particulates are not porous and will not absorb silicone oil, as does the silica. This will also obviate the absorption problem mentioned above.

The film 10 is produced by coextruding the three layers through a single extrusion die onto a chilled, rotating drum to produce a sheet that is about 45 μm in thickness. The use of a chilled drum in the coextruding process is well known in the art and will not be described in detail herein. The use of the chilled drum expedites solidification of the extruded materials by lowering their temperatures relatively quickly. From the chilled drum, the sheet is then fed into a first series of heated rollers. The first series of rollers are aligned with one another and the sheet is fed therein by running it over the first roller, under the second roller, over the third roller, and so on in an alternating manner. The first series of rollers all run at the same surface speed so that the sheet is not being stretched or pulled from the chilled drum at this point in the operation. The purpose of the first series of rollers is simply to heat the sheet after it has solidified on the drum. As the sheet runs over the first series of rollers it is raised to a temperature between approximately 60 and 90° C.

As the heated sheet is discharged from the first series of heated rollers, it is then fed into a second series of heated rollers. The second series of rollers run at about 3.5 times the surface speed of the first set of heated rollers. Because the second series of rollers has a greater surface speed than the first series of rollers, the sheet is stretched in the machine direction by approximately 350%. Each roller in the second series may rotate at the same speed or each roller in the downstream direction may rotate slightly faster than the previous roller for a smoother stretching action.

After the machine-direction stretched sheet exits the second series of heated rollers, the stretched sheet is then fed into a tenter frame that heats the film to about 125° C. The use of a tenter frame is well known in the art and need not be described in great detail herein. Basically, the tenter frame has a pair of rails that diverge apart from one another in the downstream direction of the system and clamping devices that are slidably mounted on each of the diverging rails. The clamping devices clamp the opposing lateral edges of the sheet and are then slidably moved along the diverging rails. As the clamping devices travel along the rails, they are moved apart from one another due to the divergence of the rails. As the clamping devices move apart, the sheet is stretched in the transverse direction, preferably about 450%. As is well known in the art, stretching the sheet increases its toughness and strength.

After the sheet has been stretched, it is heated to about 220° C. and then subsequently cooled to about 190° C. and then to room temperature. Heating the film to 220° C. anneals the film and provides it with suitable strength characteristics for use in the thermal printing process. Then, the lateral edges that were previously clamped are trimmed away and the finished film is wound on a paper or steel core for subsequent slitting to desired roll size for the customer. The trimmed edges can be reground for use as part of the reground PET that constitutes the aforesaid 45% of the third extrudible materials.

It can thus be seen that the objectives of the present invention have been fully and effectively accomplished. It should be realized, however, that the foregoing preferred specific embodiment has been shown and described for the purpose of illustrating the structural and functional principles of the present invention and is subject to change without departure from such principles. Therefore, the present invention includes all modifications, alterations, and substitutions encompassed within the spirit and scope of the appended claims.

What is claimed:

1. A method for performing a printing operation wherein a coloring medium is applied to a selected substrate, said method comprising:

providing a film comprising:

first and second coextruded layers;

the first layer being extruded and solidified from a first extrudible material including silicone oil, said first layer providing said film with a printer head engaging surface; and the second layer being extruded and solidified from a second extrudible material, said second layer providing said film with a color receiving surface opposite said printer head engaging surface, the silicone oil providing said first extrudible material with a lower coefficient of friction when solidified than said second extrudible material so that said printer head engaging surface has a lower coefficient of friction than said color receiving surface to thereby allow said film to slide over surfaces with less frictional resistance than if the first layer were extruded and solidified from said second extrudible material;

applying a coloring medium to the color receiving surface of said film;

engaging the printing head engaging surface of said film with a thermal printing head and engaging the color receiving surface of said film with the selected substrate;

operating said thermal printing head so that said thermal printing head applies heat to said film so as to cause said coloring medium to transfer from said color receiving surface to said selected substrate; and moving said film relative to said thermal printing head so that said printer head engaging surface slides over said thermal printing head.

2. A method according to claim 1, wherein providing said film comprises:

coextruding and solidifying said first and second extrudible materials to form said first and second layers, respectively.

3. A method according to claim 2, further comprising:

coextruding and solidifying a third extrudible material with the first and second extrudible materials to form a third layer positioned between said first and second layers.

4. A method according to claim 2, wherein said first extrudible material is devoid of silica.

5. A method according to claim 3, wherein said first extrudible material is devoid of silica.

6. A method according to claim 5, further comprising providing said first extrudible material with silicone particulates.

7. A method according to claim 3, further comprising providing said third layer with silica.

8. A method for performing a printing operation wherein a coloring medium is applied to a selected substrate, said method comprising:

provided a film comprising:

a first layer extruded and solidified from a first extrudible material, said first layer providing said film with a printer head engaging surface; and a second layer extruded and solidified from a second extrudible material, said second layer providing said film with a color receiving surface opposite said printer head engaging surface, said first extrudible material having a lower coefficient of friction when solidified than said second extrudible material so that said printer head engaging surface has a lower coefficient of friction than said color receiving surface to thereby allow said film to slide over surfaces with less frictional resistance than if the first layer were extruded and solidified from said second extrudible material;

applying a coloring medium to the color receiving surface of said film;

engaging the printing head engaging surface of said film with a thermal printing head and engaging the color receiving surface of said film with the selected substrate;

operating said thermal printing head so that said thermal printing head applies heat to said film so as to cause said coloring medium to transfer from said color receiving surface to said selected substrate; and moving said film relative to said thermal printing head so that said printer head engaging surface slides over said thermal printing head;

wherein providing said film comprises extruding and solidifying said first extrudible material to form said first layer, and extruding and solidifying said second extrudible material to form said second layer;

said method further comprising providing said first extrudible material with a slipping agent that provides said first extrudible material with the lower coefficient of friction when solidified than said second extrudible material, said slipping agent being silicone oil;

wherein said first extrudible material is devoid of silica.

9. A method according to claim 8, further comprising extruding and solidifying a third extrudible material to form a third layer positioned between said first and second layers.

10. A method according to claim 9, further comprising providing said third layer with silica.

11. A method according to claim 2, further comprising providing said first extrudible material with particulate matter.

12. A method according to claim 11, wherein said particulate matter is silica.

13. A method according to claim 11, wherein said particulate matter is silicone particulate.

* * * * *